United States Patent [19]

Garter et al.

[11] Patent Number: 5,088,274
[45] Date of Patent: Feb. 18, 1992

[54] COTTON CONVEYING STRUCTURE FOR A COTTON HARVESTER

[75] Inventors: Lee F. Garter, West Springs; Michael J. Covington, LaGrange, both of Ill.

[73] Assignee: J. I. Case Company, Racine, Wis.

[21] Appl. No.: 626,827

[22] Filed: Dec. 13, 1990

[51] Int. Cl.⁵ ............................................. A01D 46/10
[52] U.S. Cl. ............................................. 56/30; 56/12.8
[58] Field of Search .............. 56/12.8, 13.3, 28, 30, 56/32, 31

[56] References Cited

U.S. PATENT DOCUMENTS

| | | |
|---|---|---|
| 2.729.513 | 1/1956 | Swim, Jr. |
| 4.501.112 | 2/1985 | Thedford et al. ............ 56/13.3 |
| 4.660.359 | 4/1987 | Deutsch ........................ 56/13.3 |
| 4,875,330 | 10/1989 | Deutsch et al. ............... 56/41 |
| 4,928,459 | 5/1990 | Thedford et al. ............ 56/13.3 |
| 4,930,299 | 6/1990 | McBee .......................... 56/30 |

Primary Examiner—Terry Lee Melius
Attorney, Agent, or Firm—Dressler, Goldsmith, Shore, Sutker & Milnamow

[57] ABSTRACT

A cotton conveying structure which directs doffed cotton toward a cotton receptacle and readily allows both vertical and lateral movement of a harvesting unit to which it is connected. The conveying structure includes at least one discharge duct assembly defining an elongated cotton flow passage opening at one end to a harvesting mechanism of a harvesting unit and opening at an opposite end to exahust cotton into a cotton receptacle. The duct assembly is provided with an intermediate section defined by a pair of elongated tubes which telescopically move relative to each other to maintain integrity of the duct assembly upon movement of the harvesting unit.

11 Claims, 5 Drawing Sheets

FIG-3

COTTON CONVEYING STRUCTURE FOR A COTTON HARVESTER

FIELD OF THE INVENTION

The present invention generally relates to cotton harvesters and, more particularly, to an improved cotton conveying structure allowing for vertical and lateral movements of the harvesting units while maintaining integrity of the cotton conveying structure.

BACKGROUND OF THE INVENTION

A typical cotton harvester includes a plurality of harvesting units at a forward end thereof for picking or harvesting adjacent rows of cotton as the harvester is driven across a field. The cotton removed from the plants by the harvesting units is directed through a cotton conveying system and is ultimately discharged into a receptacle or basket.

A conventional cotton conveying system includes lower duct structure for directly receiving cotton from the harvesting units and upper duct structure depending from the cotton receptacle and arranged in cotton conveying relation with the lower duct structure. To permit vertical displacement of the harvesting units between a lower operating position and an upper transport position, the duct structures telescope one inside of the other.

Recent advancements in cotton harvesters allow the harvesting units to be easily and laterally moved relative to each other. The ability to laterally move the harvesting units facilitates inspection and/or servicing thereof and furthermore promotes adjustability for different row spacings. Extended lateral movement of the harvesting unit, however, may be severely hampered by the duct structures of the cotton conveying system connected thereto. The inflexibility of the duct structures to move in a lateral direction has sometimes required that the lower duct structure be disconnected from either the harvesting unit or the upper duct structure before the harvesting unit is moved to a serviceable position.

As will be appreciated, disconnecting the duct structure from the harvesting unit or from associated duct structure to facilitate lateral movement of the harvesting unit is awkward and time consuming. The problem is exacerbated when other panels or portions on the harvesting unit must be removed to gain access to a harvesting mechanism therewithin. Moreover, additional time is involved to reconnect the duct structure to either the harvesting unit or other duct structure before the harvesting operation can commence. Of course, during a harvesting operation, time is at a premium.

Thus, there is a need and a desire for a cotton conveying structure which promotes both vertical and lateral movements of harvesting units while maintaining integrity of the cotton conveying structure.

SUMMARY OF THE INVENTION

In view of the above, and in accordance with the present invention, there is provided a cotton conveying structure which directs doffed cotton toward a cotton receptacle and readily allows both vertical and lateral movements of a harvesting unit to which it is connected. The conveying structure of the present invention includes at least one discharge duct assembly defining an elongated cotton flow passage opening at one end to a harvesting mechanism of a harvesting unit and opening at an opposite end to exhaust cotton into the cotton receptacle. The duct assembly is provided with an intermediate section defined by a pair of elongated tubes which telescopically move relative to each other to maintain integrity of the duct assembly upon movement of the harvesting unit. Each elongated tube in the intermediate section of the duct assembly is connected to an adjacent section of the duct assembly by a hinge. Each hinge allows for flexible movement of the duct assembly about two axes in response to movement of the harvesting unit relative to the frame.

In a preferred form of the invention, the duct assembly includes lower and upper duct structures. The lower duct structure is preferably connected to the harvesting unit for movement therewith and has an inlet generally exposed to the harvesting mechanism of the harvesting unit for receiving cotton therefrom. The upper duct structure is relatively stationary and depends from the cotton receiving receptacle. The telescoping tubes defining the intermediate section of the duct assembly connect the upper and lower duct structures in cotton conveying relation relative to each other.

Each hinge connects the intermediate section to adjacent duct structure of the duct assembly and allows relative movement therebetween in perpendicular planes. Each hinge includes first and second pivots. The first pivot allows rocking movement of a connected tube relative to an adjacent duct structure about a fore-and-aft extending axis. The second pivot allows rocking movement of a connected tube relative to an adjacent duct structure about a laterally extending axis.

The intermediate section of the cotton conveying system of the present invention further includes a flexible boot arranged at that end of each tube which is connected to the remainder of the duct assembly. Each boot is configured to sealingly surround a joint defined by an adjacent portion of the duct assembly and the tube connected thereto thereby inhibiting cotton from escaping from the conveying structure through that joint. Each boot furthermore serves to telescopically guide the upper and lower duct structures relative to the intermediate section of the duct assembly upon movement of the harvesting unit.

The cotton conveying structure of the present invention further includes an air nozzle for promoting the movement of doffed cotton between the harvesting unit and the receptacle. In the illustrated embodiment, the air nozzle extends into the lower duct structure of the duct assembly and directs an air stream upwardly therethrough. The movement of air through the duct assembly operates to draw cotton from the harvesting mechanism toward and through the inlet defined by the duct assembly.

In the illustrated embodiment, the elongated tubes comprising the intermediate section of the duct assembly remain interconnected to each other throughout the range of movement of the harvesting unit with which they are associated. Preferably, the upper tube is connected to and supported by the upper duct structure of the duct assembly. The lower tube telescopically moves with the lower duct structure of the duct assembly and moves endwise relative to the upper tube.

Occasionally, the harvesting units are disconnected from the cotton conveying structure for repair or replacement thereof. A latch mechanism releasably interconnects the elongated tubes of the intermediate section relative to each other to inhibit their disassociation from each other upon disconnection of a harvesting unit therefrom.

The present invention offers a cotton conveying structure which is more flexible than that previously known and promotes both vertical and lateral movements of the harvesting units relative to the frame of the harvester. The enhanced ability to move the harvesting units laterally without having to disconnect the duct structure associated therewith will facilitate inspection and servicing of the row units as well as allowing them to be selectively adjusted to adapt to different row spacings.

Numerous other features and advantages of the present invention will become readily apparent from the following detailed description, the accompanying drawings, and the appended claims.

DETAILED DESCRIPTION OF THE PRESENT INVENTION

While the present invention is susceptible of embodiment in various forms, there is shown in the drawings a presently preferred embodiment hereinafter described with the understanding that the present disclosure sets forth an exemplification of the invention which is not intended to limit the invention to the specific embodiment illustrated.

Referring now to the drawings, wherein like reference numerals indicate like parts throughout the several views, there is shown a self-propelled cotton harvester 10. The cotton harvester 10 includes a foreand-aft extending frame 12 having an operator station 14 arranged at a forward end thereof. The frame 12 is supported on a front pair of ground engaging drive wheels 16 and a rear pair of ground engaging steering wheels 18 which provide the harvester 10 with proper direction. In the preferred embodiment, a cotton receiving basket or receptacle 20 is mounted on the frame 12.

Figure 1:
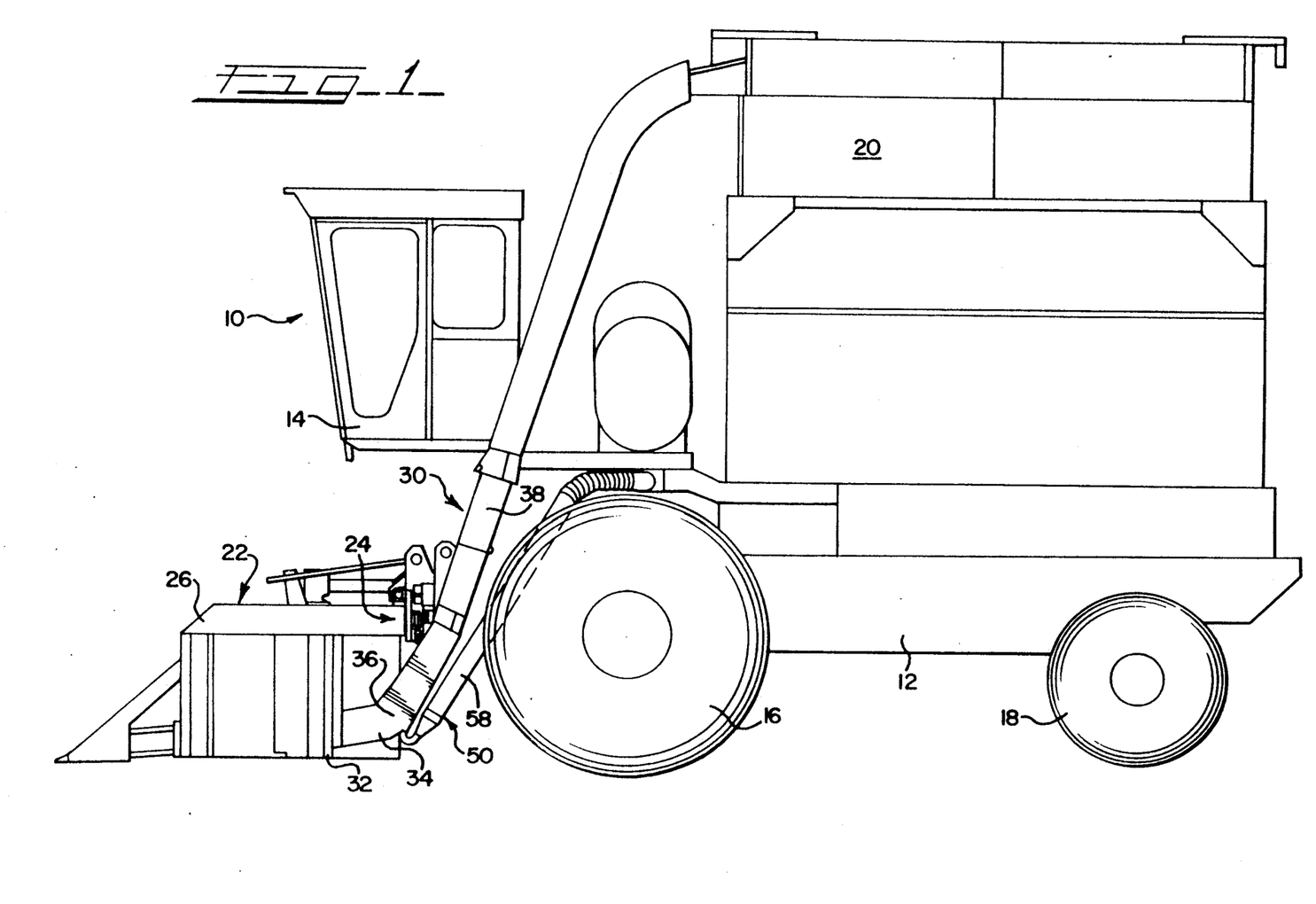
FIG. 1 is a side elevational view of a cotton harvester with cotton conveying structure embodying principle of the present invention attached thereto.
Figure 2:
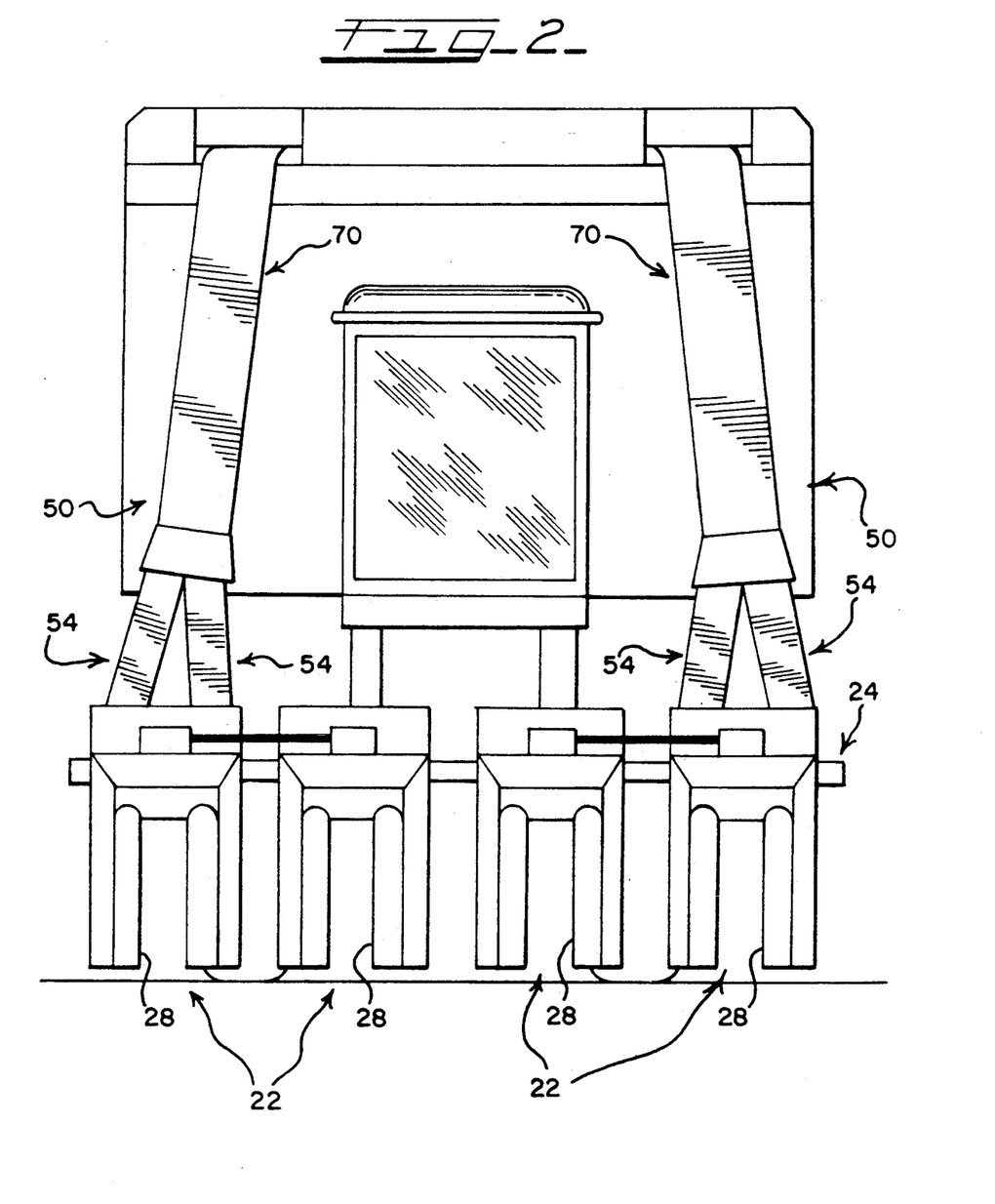
FIG. 2 is a front view of the cotton harvester illustrated in FIG. 1.

As illustrated in FIG. 2, a plurality of harvesting units 22 are supported at a forward end of a harvester frame 12. The harvesting units 22 are connected to the frame 12 in side-by-side order for harvesting adjacent and generally parallel rows of cotton as the harvester moves over a field of cotton. The harvesting units are supported at the forward end of the harvester by a mounting system 24 (FIG. 1) allowing for vertical and lateral movements of the harvesting units relative to the frame of the harvester.

The mounting system 24 for the harvesting units is preferably of the type shown and described in coassigned U.S. Pat. No. 5,010,718 and entitled "A SYSTEM FOR MOUNTING AND SUPPORTING HARVESTING UNITS OF A COTTON HARVESTER." Notably, the mounting system 24 provides for vertical and substantial lateral adjustment of the harvesting units 22 relative to each other to allow for servicing and inspection thereof and furthermore provide for different row spacings of the harvesting units.

Figure 3:
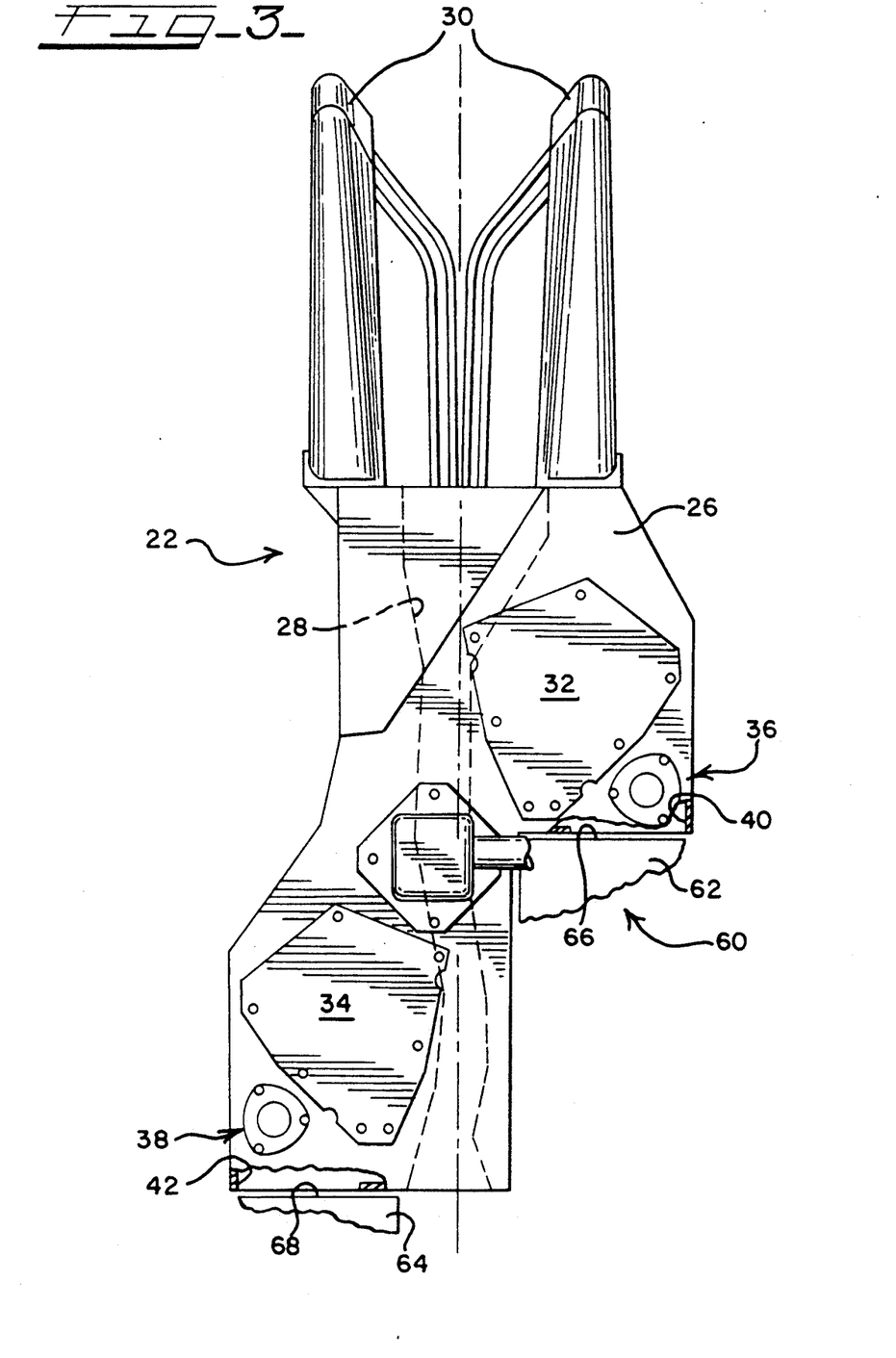
FIG. 3 is a plan view of a harvesting unit from which the cotton conveying structure of the present invention extends.

In a preferred form of the invention, each harvesting unit is substantially similar in structure. Turning now to FIG. 3, each harvesting unit includes a housing assembly 26 defining a fore-and-aft crop receiving opening or plant passage 28. Each harvesting unit is further provided with stalk lifters 30 forwardly extending from housing 26 on opposite sides of opening 28 to guide the row of plants to the opening or passage 28.

Each harvesting unit further includes a rotary harvesting mechanism. In a preferred form of the invention, such rotary harvesting mechanism includes forward and rear upright picker rotor assemblies 32 and 34, respectively, which, in the preferred embodiment, are arranged on opposite sides of the foreand-aft plant passage 28. Adjacent the picker rotor assemblies 32 and 34 are conventional upright doffer assemblies 36 and 38, respectively.

During operation of the harvester, the doffer assemblies 36 and 38 remove or doff cotton from the picker spindles on the respective picker rotor assembly and propel the doffed cotton outwardly through discharge openings 40 and 42 defined by the housing assembly 26.

The cotton harvester 10 further includes cotton conveying structure for directing cotton removed from the cotton plants toward the cotton receiving receptacle or basket 20. As shown in FIG. 1, the cotton conveying structure includes at least one discharge duct assembly 50 defining an elongated passage 52 through which cotton is adapted to flow and which opens at one end to the harvesting mechanism of a harvesting unit 22 for receiving cotton therefrom and opens at an opposite end to exhaust cotton into the cotton receptacle 20 (FIG. 1).

Figure 4:
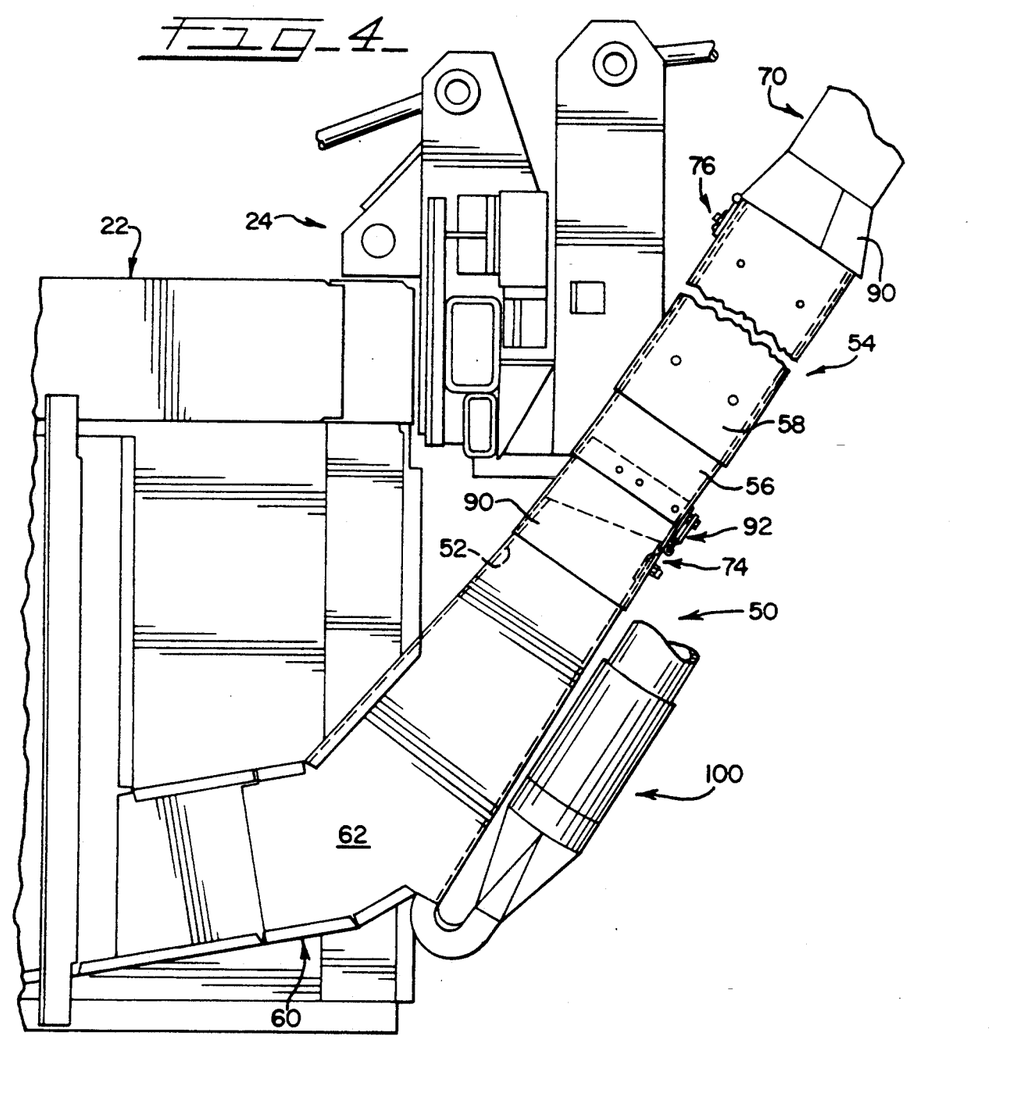
FIG. 4 is an enlarged side elevational view showing an intermediate section of the cotton conveying structure.

Each duct assembly 50 includes duct structure 54 arranged intermediate opposite ends of duct assembly 50 and 54 which allows for vertical and lateral movements of a respective harvesting unit while maintaining integrity of the cotton conveying structure. As shown in FIG. 4, intermediate duct structure 54 includes a pair of elongated tubes 56 and 58 which are telescopically movable relative to each other to maintain integrity of the cotton conveying structure throughout the range of movement of the harvesting unit with which it is associated.

The discharge duct assembly 50 further includes lower duct structure 60 and upper duct structure 70 which are joined in cotton conveying relation relative to each other by the intermediate section 54. As shown in FIG. 3, the lower duct structure includes first and second duct structures 62 and 64, respectfully. The first duct structure 62 is adapted for movement with the respective harvesting unit and has an inlet 66 exposed to and receiving cotton from the front picker rotor assembly 32 and associated doffer assembly 36. The second duct structure 64 is also adapted for movement with the respective harvesting unit and has an inlet 68 exposed to and receiving cotton from the rear picker rotor assembly 34 and associated doffer assembly 38. The inlets 66, 68 of the duct structures 62 and 64, respectfully, are substantially aligned in a fore-and-aft direction with the discharge openings 40 and 42, respectfully, on the housing assembly and extend substantially along the entire height of the harvesting unit to receive doffed cotton. Although their lengths may vary as a function of the picker rotor assembly with which they are associated, the function of the first and second duct structures 62 and 64, respectfully, are the same.

As illustrated in FIG. 1, the upper duct structure 70 opens to and depends from the cotton receptacle 20. The upper duct structure 70 may be fixed to and supported by the frame 12 of the harvester. As shown in FIG. 2, the upper duct structure 70 is configured to concurrently receive cotton from both of the intermediate duct structures 54 extending from duct structures 62 and 64 (FIG. 3), respectfully, of the lower duct structure 60.

As shown in FIG. 4, each tube 56, 58 of the intermediate section 54 is independently connected to an adjacent section or portion of the duct assembly as by hinge mechanisms 74 and 76 to allow for flexible movement of the duct assembly in response to movement of the harvesting units. Each hinge mechanism 74, 76 allows for relative movement between a tube of the intermediate duct structure and adjacent duct structure about two axes extending generally normal to each other.

Figure 5:
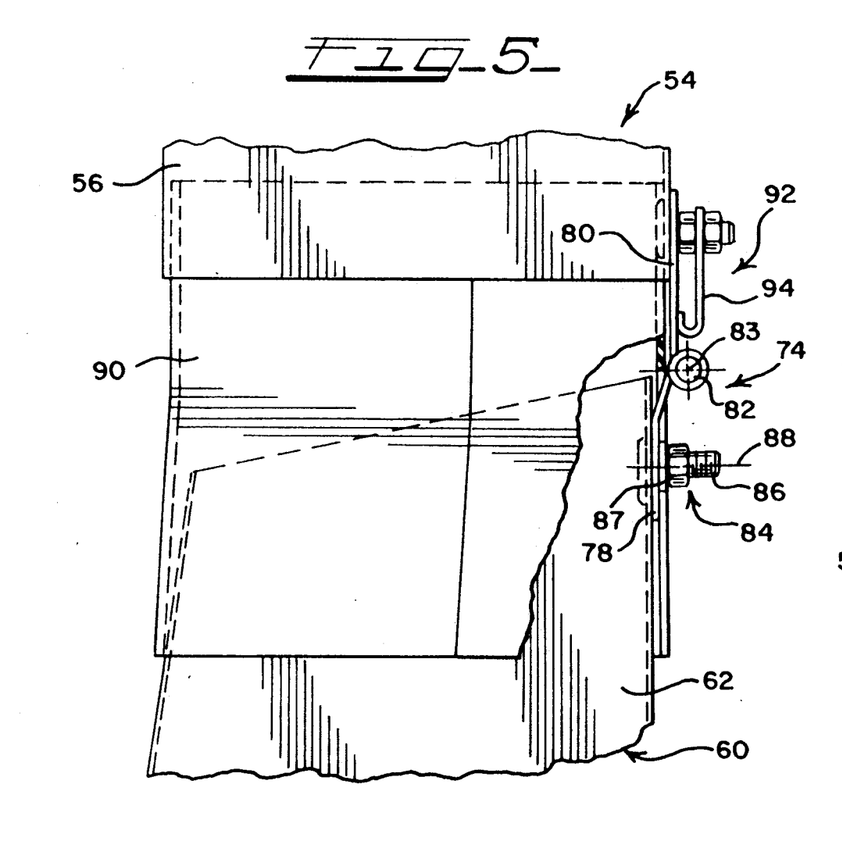
FIG. 5 is an enlarged side elevational view partially broken away showing a lower end of an intermediate section and its connection to adjacent duct structure.

Since the hinge mechanism 74, 76 are substantially similar to each other, only hinge mechanism 74 will be discussed in detail with the understanding that hinge 76 is substantially similar thereto. As shown in FIG. 5, each hinge preferably includes first and second members 78 and 80 which are rotatably interconnected along adjacent lateral edges thereof as with a pin 82 which defines a first pivot allowing rocking movement of the respective tube of the intermediate section relative to a respective duct structure about a laterally extending axis 83. As shown, hinge member 78 is connected to a wall of the lower duct structure 60 of the cotton conveying system by fastening means 84. In the illustrated embodiment, fastening means 84 includes a fore-and-aft extending bolt 86 which is fastened by a nut 87 to allow for rocking movement of the respective tube and duct structure about a second axis 88 which is preferably vertically spaced from the first axis 83 and allows for rocking movement between the intermediate section 54 and the duct structure to which it is connected.

The intermediate duct structure 54 of each duct assembly further includes a flexible boot 90 provided at opposite ends thereof. Each boot 90 is configured to sealingly, surround a joint defined by the intermediate duct structure 54 and the duct structure connected thereto. In a preferred form, the flexible boot 90 includes a rubber-like flap which is affixed to and extends from an end of each tube 56, 58. The free end of each boot 90 guides the free end of the respective duct structure relative to the intermediate duct structure 54 associated therewith. Each boot 84 furthermore inhibits cotton from escaping from the conveying structure through the joint and onto the ground or field.

In the illustrated embodiment, tube 56 of the intermediate duct structure 54 is freely and endwise movable relative to tube 58. The cotton conveying structure of the present invention further includes a latch mechanism 92 for releasably securing tube 56 to tube 58 upon connection of the harvesting unit from the duct assembly 50.

Figure 6:
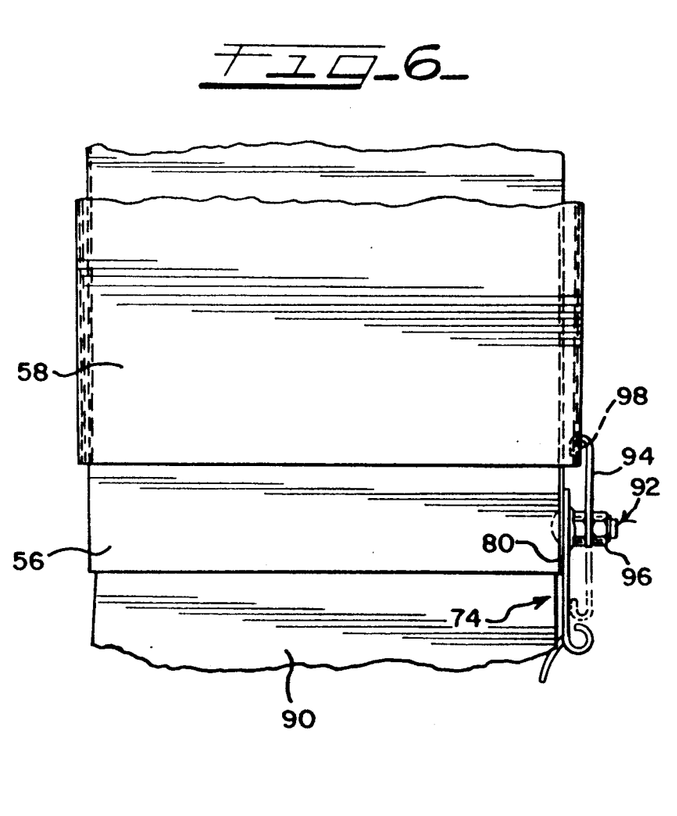
FIG. 6 is a schematic illustration of a latch mechanism for selectively and releasably interconnecting component parts of the intermediate section relative to each other to inhibit their disassembly from each other upon disconnection of a harvesting unit therefrom.

As shown in FIGS. 5 and 6, latch mechanism 92 includes a latch member 94 having a hookshaped free end portion. Latch member 94 is preferably carried for free rotatable movement on tube 56 of the intermediate duct structure. In a most preferred form, latch member 94 is free to rotate about the axis of a foreand-aft fastener 96 used to secure hinge member 80 of hinge mechanism 74 to tube 56 of the intermediate duct structure.

The hook-shaped end of the latch member 94 is adapted to rotate and fit in a close ended slot 98 defined on tube 58 (FIG. 6) of the intermediate duct structure 54. Upon disconnection of the intermediate duct structure 54 from the lower duct structure 60, tube 56 of intermediate duct structure 54 will gravitationally move downwardly and the hook-shaped member 94 will engage with the slot 98 thereby inhibiting disassociation between the tubes 56, 58 of the intermediate duct structure.

To draw doffed cotton into the duct assembly and propel the harvested cotton toward the receptacle, each lower duct structure 62, 64 includes an air nozzle 100. In a conventional manner, the air nozzle 100 opens into the elongated passage 52 leading to the cotton receptacle and directs a pressurized stream of fluid, commonly air, upward through the duct assembly toward the receptacle 20.

During operation of the harvester, the present invention offers a distinct advantage of maintaining integrity of the cotton conveying system while allowing for extended vertical and lateral movements of harvesting unit 22. The tubes 56, 58 of the intermediate duct structure 54 telescopically move relative to each other to accommodate vertical movements of the harvesting units. The ability of each hinge mechanism 74, 76 to rotate about the axis of laterally elongated pins 82 furthermore facilitates vertical displacement of the harvesting units while maintaining integrity of the cotton conveying system.

In addition to facilitating vertical movement of a respective harvesting unit, the intermediate duct structure 54 of each duct assembly furthermore accommodates lateral movement of the harvesting unit. In addition to telescopic movement, the tubes 56, 58 of the intermediate duct structure 54 are free to rock about the fore-and-aft axis 88 of the of each hinge mechanism 74 and 76. Therefore, a substantial amount of lateral movement can also be effected for the harvesting units thereby providing inspectional and/or service access and facilitating proper row spacings between the harvesting units while maintaining integrity of the cotton conveying system.

The flexible boot 90 at opposite ends of the intermediate duct structure 54 adds to the flexibility of the duct assembly 50. Not only does each boot 90 inhibit cotton from inadvertently escaping between the joint established between the intermediate duct structure 54 and the remainder of the duct assembly 50, it also acts to guide the free ends of the duct structures 60 and 70 and the intermediate section upon movement of the harvesting unit.

Normally, the lower tube 56 would become disassociated from the intermediate duct structure 54 upon disconnection of the duct assembly 50 from a respective harvesting unit. Latch mechanism 92, however, temporarily holds the telescoping tubes 56 and 58 in a collapsed position to facilitate attachment and/or servicing of the harvesting unit.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. Cotton conveying structure for a cotton harvester having a harvesting unit supported at a forward end of a frame and movable vertically and horizontally relative to said frame, said harvesting unit including a harvesting mechanism for removing cotton from plants as the harvester is driven across a field, said cotton conveying structure directing cotton from said harvesting unit toward a cotton receiving receptacle and comprising:

a discharge unit assembly comprised of lower duct structure, intermediate duct structure, and upper duct structure defining an elongated passage through which cotton is adapted to flow, said lower duct structure opening at a lower end to the harvesting mechanism of said harvesting unit for receiving cotton therefrom, said upper duct structure opening at an upper end to exhaust cotton into said cotton receptacle, with said intermediate duct structure being connected to and joining said lower and upper duct structure, said intermediate duct structure including a pair of elongated tubes telescopically interconnected to each other and defining a portion of said elongated passage, said tubes being movable relative to each to maintain integrity of the duct assembly upon movement of the harvesting unit, upper and lower ends of respective tubes of the intermediate duct structure being connected to adjacent duct structure by hinge means allowing for flexible movement between adjacent duct structures of said duct assembly about two vertically spaced axes in response to movement of the harvesting unit relative to the frame.

2. The cotton conveying structure according to claim 1 wherein said intermediate duct structure further includes a flexible boot provided at opposite ends thereof, each boot being configured to sealingly surround a joint defined by an end of the intermediate duct structure and the adjacent duct structure connected thereto thereby inhibiting cotton from escaping from the discharge duct assembly through said joint.

3. The cotton conveying structure according to claim 1 further including air nozzle means passing into said duct assembly for directing a pressurized flow of air therethrough and away from said harvesting unit.

4. The cotton conveying structure according to claim 1 further including means for releasably securing said pair of tubes to each other upon disconnection of the duct assembly from the harvesting unit.

5. The cotton conveying structure according to claim 4 wherein said securing means includes manually operated latch means for releasably interconnecting the tubes of the intermediate duct structures to inhibit their disassociation from each other upon disconnection of the cotton conveying structure from a respective harvesting unit.

6. The cotton conveying structure according to claim 1 wherein said hinge means includes a first pivot allowing rocking movement between a tube of said intermediate duct structure and an adjacent duct structure about a fore-and-aft extending axis and a second pivot allowing rocking movement between the tube and said adjacent duct structure about a laterally extending axis.

7. Cotton conveying structure for a cotton harvester having a harvesting unit supported at a forward end of a fore-and-aft extending frame and movable vertically and laterally relative to the frame, said harvesting unit including front and rear picker rotor assemblies and a pair of doffer assemblies arranged in combination with the picker rotor assemblies, said cotton conveying structure serving to direct cotton removed from cotton plants toward a cotton receiving receptacle and comprising:

a first lower duct structure connected to said harvesting unit and having an inlet exposed to and receiving cotton from the front picker rotor and doffer assembly combination;

a second lower duct structure connected to said harvesting unit and having an inlet exposed to and receiving cotton from the rear picker rotor and doffer assembly combination;

an upper duct structure opening to and depending from said cotton receiving receptacle, said upper duct structure being configured to concurrently receive cotton from both said first and second lower duct structures;

intermediate duct structure individually interconnecting each lower duct structure in cotton conveying relation to said upper duct structure, said intermediate duct structure including a first telescoping tube assembly extending between an exhaust end of said second lower duct structure and said upper duct structure and a second telescoping tube assembly extending between an exhaust end of said first lower duct structure and said upper duct structure;

pivot structure for independently connecting opposite ends of each telescoping tube assembly to said upper duct structure and respective lower duct structures, each pivot structure including separate upper and lower hinge means on each tube assembly, wherein each hinge means allows for relative rocking movement between the respective duct structure and the telescoping tube assembly connected thereto about two axes extending generally normal to each other so as to allow the harvesting unit to move vertically and laterally relative to the frame while maintaining integrity of the cotton conveying structure.

8. The cotton conveying structure according to claim 7 wherein each telescoping tube assembly includes telescoping lower and upper elongated tubes, and a flexible boot carried by the lower tube of each telescoping tube assembly, said flexible boot sealingly surrounds a joint defined whereat each telescoping tube assembly joins to the respective lower duct structure thereby inhibiting cotton from discharging to the ground from said joint.

9. The cotton conveying structure according to claim 9 wherein each telescoping tube assembly further includes manually actuated latch means for releasably affixing the lower and upper tubes of the tube assembly to each other upon disassembly of the cotton conveying structure.

10. The cotton conveying structure according to claim 7 wherein each of said lower duct structures includes nozzle means for directing a pressurized flow of air therethrough and away from said inlet.

11. The cotton conveying structure according to claim 7 wherein each of said hinge means includes first and second hinge members interconnected by an elongated pin, and wherein at least one of said hinge members is connected to respective duct structure for rocking movement about an axis extending generally normal to the longitudinal axis of said elongated pin.

* * * * *